(12) United States Patent
King et al.

(10) Patent No.: US 7,266,846 B2
(45) Date of Patent: Sep. 4, 2007

(54) SYSTEM AND METHOD OF FACILITATING COMPLIANCE WITH INFORMATION SHARING REGULATIONS

(75) Inventors: Linda Giessel King, San Antonio, TX (US); Charles Lee Orr, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 795 days.

(21) Appl. No.: 10/324,262

(22) Filed: Dec. 18, 2002

(65) Prior Publication Data

US 2003/0126469 A1 Jul. 3, 2003

Related U.S. Application Data

(60) Provisional application No. 60/344,162, filed on Dec. 26, 2001.

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04L 9/00* (2006.01)
*H04L 9/32* (2006.01)

(52) U.S. Cl. ......................... 726/26; 713/164; 380/227; 705/1; 705/24

(58) Field of Classification Search .................... 726/1, 726/26

See application file for complete search history.

(56) References Cited

U.S. PATENT DOCUMENTS

| 5,715,403 | A  | * | 2/1998  | Stefik ........................... 705/44 |
| 2002/0007456 | A1 | * | 1/2002  | Peinado et al. ............. 713/164 |
| 2002/0107701 | A1 | * | 8/2002  | Batty et al. .................... 705/1 |
| 2002/0196940 | A1 | * | 12/2002 | Isaacson et al. ............ 380/227 |

* cited by examiner

*Primary Examiner*—Kambiz Zand
*Assistant Examiner*—Jason K. Gee
(74) *Attorney, Agent, or Firm*—Woodcock Washburn LLP

(57) ABSTRACT

The present invention provides a system and method of facilitating compliance to one or more information sharing regulations. The present invention provides a computer system equipped with a processing unit capable of receiving input information and extracting one or more data sharing guidelines. The present invention utilizes the relationship between the parties and the data at issue to construct a data sharing arrangement. Each data sharing arrangement may be cross-referenced to one or more data sharing guidelines designed to assist the user to determine what privacy regulations apply and how to comply with same.

20 Claims, 9 Drawing Sheets

SYSTEM AND METHOD OF FACILITATING COMPLIANCE WITH INFORMATION SHARING REGULATIONS

This patent application claims priority upon a provisional patent application entitled "Privacy Compliance," Ser. No. 60/344,162, having a filing date of Dec. 26, 2001.

FIELD OF THE INVENTION

The present invention relates generally to information management and, more particularly, to a system and method of facilitating compliance with one or more information sharing guidelines.

BACKGROUND OF THE INVENTION

The importance of electronic communication has increased dramatically in recent years. Information exchanges performed via paper copies not long ago are now the domain of electronic communication.

The emergence of the Internet has contributed to the ease at which information may be accessed and utilized. As a result, the exchange of electronic information has become a powerful business tool for statistical consumer preference analysis.

Unfortunately, while the collection and analysis of such data can be of great public benefit, it can also be the subject of considerable abuse. To address this concern, State and Federal lawmakers have enacted information sharing regulations governing the exchange of personal information. For example, the recently passed Graham-Leach-Bliley Act provides that every financial institution has a continuing obligation to respect the privacy of its customers as well as protect the security and confidentiality of customers' non-public personal information.

As a result, entities and/or individuals wishing to make use of consumer information must address and comply with applicable data sharing regulations. To accomplish this, there remains a need for a system and method capable of identifying applicable information sharing regulations and facilitating the successful compliance with same.

SUMMARY OF THE INVENTION

Accordingly, the present invention provides a system and method of facilitating compliance with one or more data sharing guidelines. The present invention provides a computer system having a processing unit capable of receiving input information and extracting one or more data sharing guidelines for use in complying with applicable privacy regulations. The present invention utilizes the relationship between the parties and the type of data at issue to construct a data sharing arrangement. Each data sharing arrangement may be cross-referenced to one or more data sharing guidelines stored upon a storage device electronically coupled to the system. In one embodiment, data sharing guidelines are formulated from State and Federal regulations governing information exchange, and are provided through a convenient graphic user interface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

The present invention is herein described as a system and method of facilitating compliance with one or more information sharing regulations.

Figure 1:
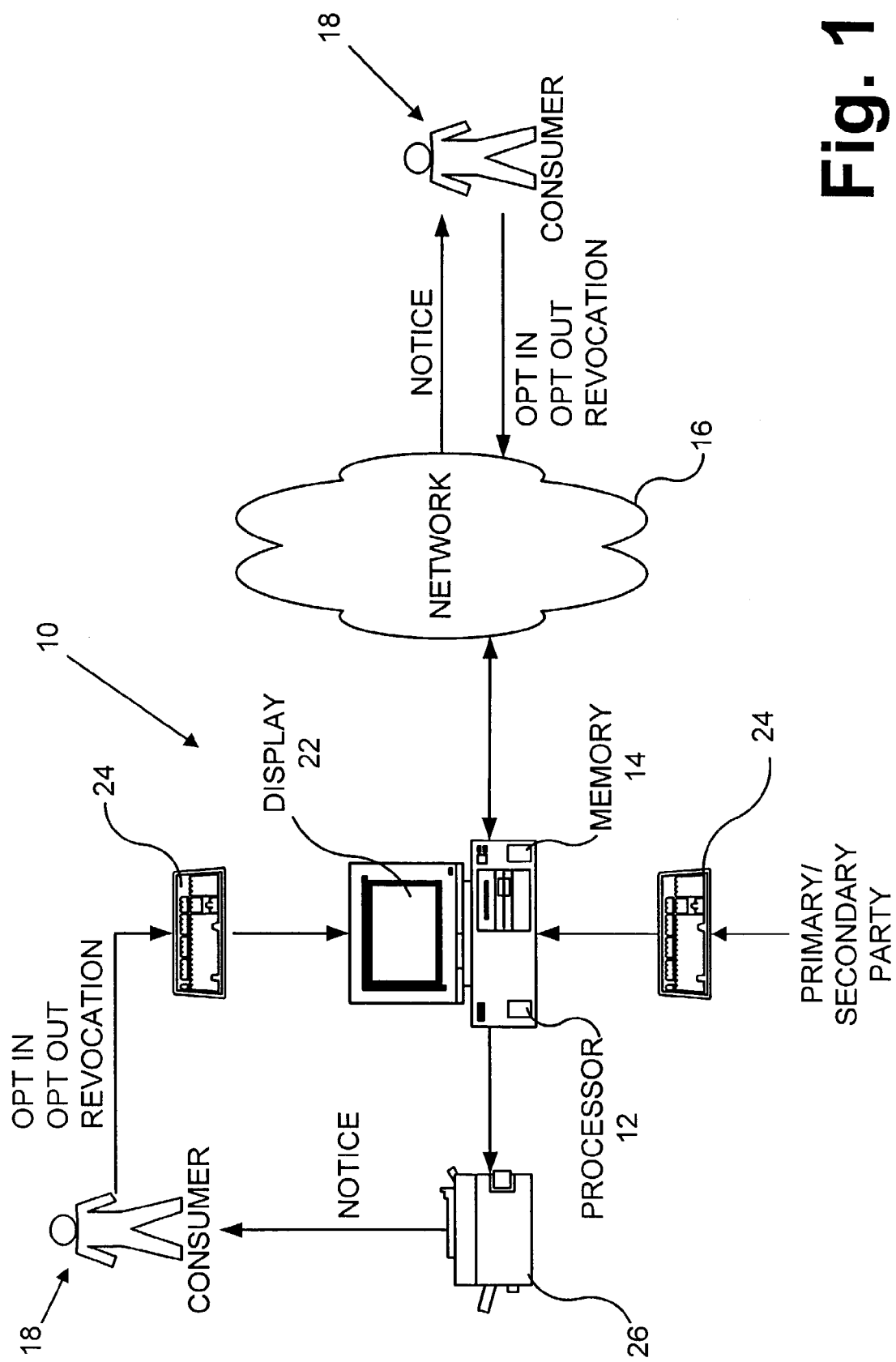
FIG. 1 is a component diagram of one embodiment of the present invention.

Referring to FIG. 1, the computer system (10) of the present invention provides a processing unit (12) capable of receiving and processing electronic data. In one embodiment, the processing unit of the present invention is electronically coupled to one or more storage devices (14) capable of storing electronic data.

The present invention may utilize a networking unit (not shown) capable of facilitating electronic communication over a computer network (16). Specifically, the networking unit is capable of facilitating electronic communication between consumers (18) and/or service personnel (20) with the processing unit (12) of the present invention. In one embodiment, a CISCO® router or other networking device may be utilized by the present invention. Further, the computer system of the present invention may be equipped with a display device (22) capable of providing visual images to the user.

The storage device (14) of the present invention is populated with electronic data relevant to a determination of applicable privacy guidelines. In one embodiment, this is accomplished by inputting information relating to each party wishing to engage in information sharing activities.

Figure 2:
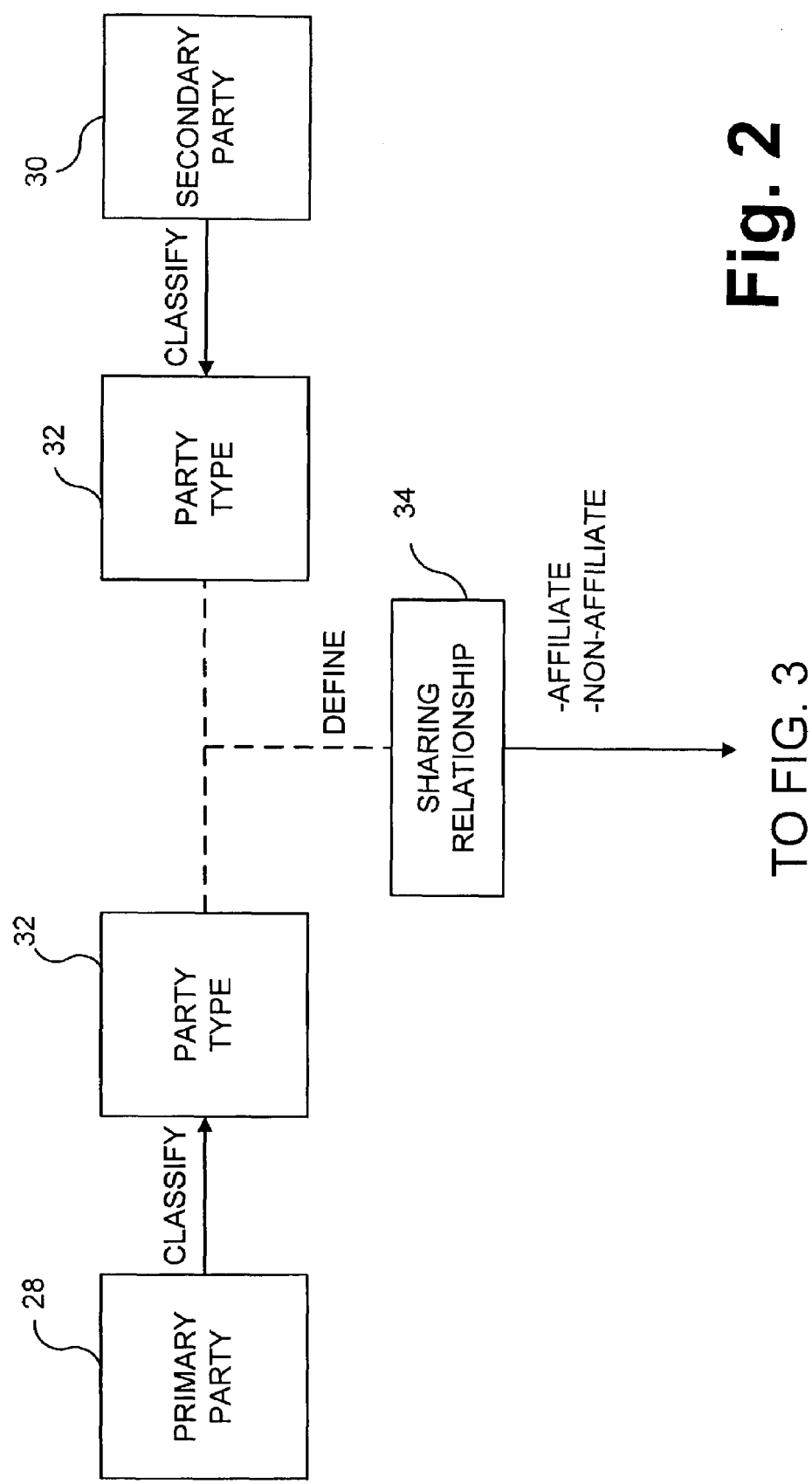
FIG. 2 is a process flow diagram illustrating the sharing relationship definition process of one embodiment of the present invention.

Referring to FIG. 2, information relating to the party wishing to share information (i.e., the sharing party (28)) and the party wishing to receive information (i.e., the receiving party (30)) is provided to the system via the input device (24). Although a keyboard is shown in the figures, it should be noted that any number of input devices may be utilized to provide electronic data to the system and that such data may be electronically imported over a computer network (16).

The computer system of the present invention provides a graphic user interface to facilitate convenient entry of electronic data. FIGS. 5-9 illustrate portions of the graphic user interface utilized in one embodiment, as discussed further below.

Referring to FIGS. 1 and 2, the present invention provides a unique method of facilitating compliance with any number of privacy regulations. In one embodiment, this is accomplished by receiving data concerning the sharing party (28) and the receiving party (30). This party data is then stored upon the storage device (14) such that each party may be classified according to one of a plurality of predetermined party types (32).

This information is then used to determine what relationship (34), if any, exists between the parties. For example, if the receiving party is affiliated with the sharing party, the parties are identified as having an affiliate sharing relationship.

This feature of the present invention is of unique importance in the field of privacy compliance. By determining a sharing relationship (34) between the parties, the present invention narrows the number of information sharing regulations that may be relevant to the proposed information sharing activity. For example, the Graham-Leach-Bliley Act (GLB) distinguishes between sharing arrangements between affiliated parties and non-affiliated parties for the purpose of compliance. Thus, by identifying and defining a sharing relationship (34), the present invention allows the applicable regulations to be located in a shorter time frame.

Figure 3:
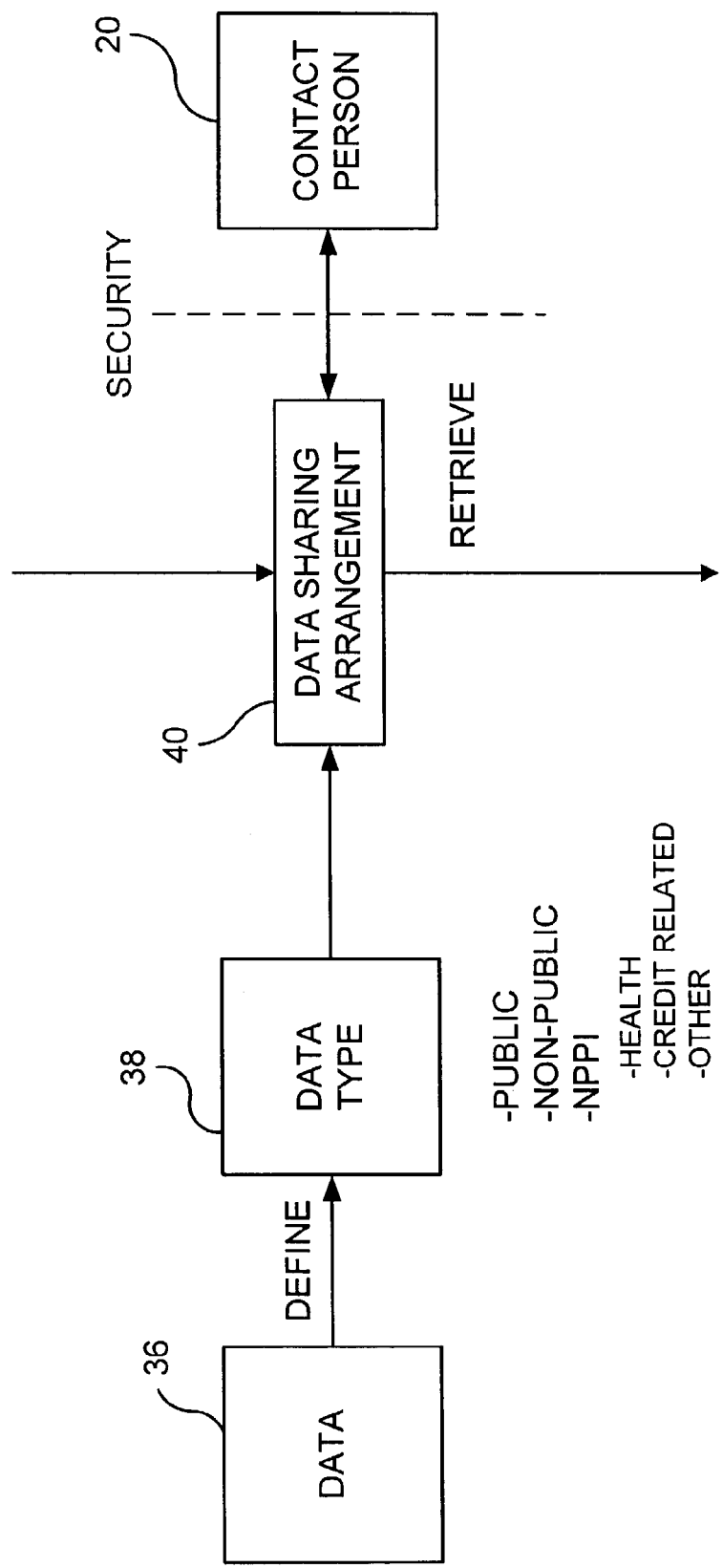
FIG. 3 is a process flow diagram illustrating the data sharing arrangement definition process of one embodiment of the present invention.

Referring to FIG. 3, in addition to the determination of the applicable sharing relationship, the present invention identifies the type of customer data to be shared, as illustrated by Boxes (36) and (38). In addition to the relationship between the parties, the type of data being shared is also important to the determination of applicable information sharing regulation(s).

For example, information that is readily available to the public, such as name and address information already listed in a phone book, is not likely to be subjected to rigid information sharing regulations. Due to the wide variety of data available, the present invention defines the data (36) according to a plurality of predefined data types (38).

In one embodiment, data types (38) are broadly defined into three major categories including public data, non-public data, and non-public personally identifiable (NPPI) data. NPPI data is personal information that is not in the public domain and pertains to an identifiable person. Due to the sensitive nature of NPPI data, the present invention divides (NPPI) into subcategories to allow for the formulation of accurate and specific data sharing arrangements (40). In one embodiment, NPPI is divided into health related data, credit related data, and other data. This feature of the present invention allows the system to identify and retrieve guidelines relating to information sharing regulations addressing a specific type of NPPI data, as discussed below.

In one embodiment, information relating to the data sharing arrangement (40) may be retrieved from a contracting storage device (not shown). In this embodiment, the terms and conditions of each information sharing activity are stored upon the contracting storage device. This contractual information may then be imported or retrieved by the processing unit (12) of the present invention such that party information, data type information, etc., may be utilized by the system (10). This feature of the present invention reduces the time and expense of populating the system with the required information and in turn, reduces the overall time required to ascertain the applicable information sharing guidelines.

Figure 4:
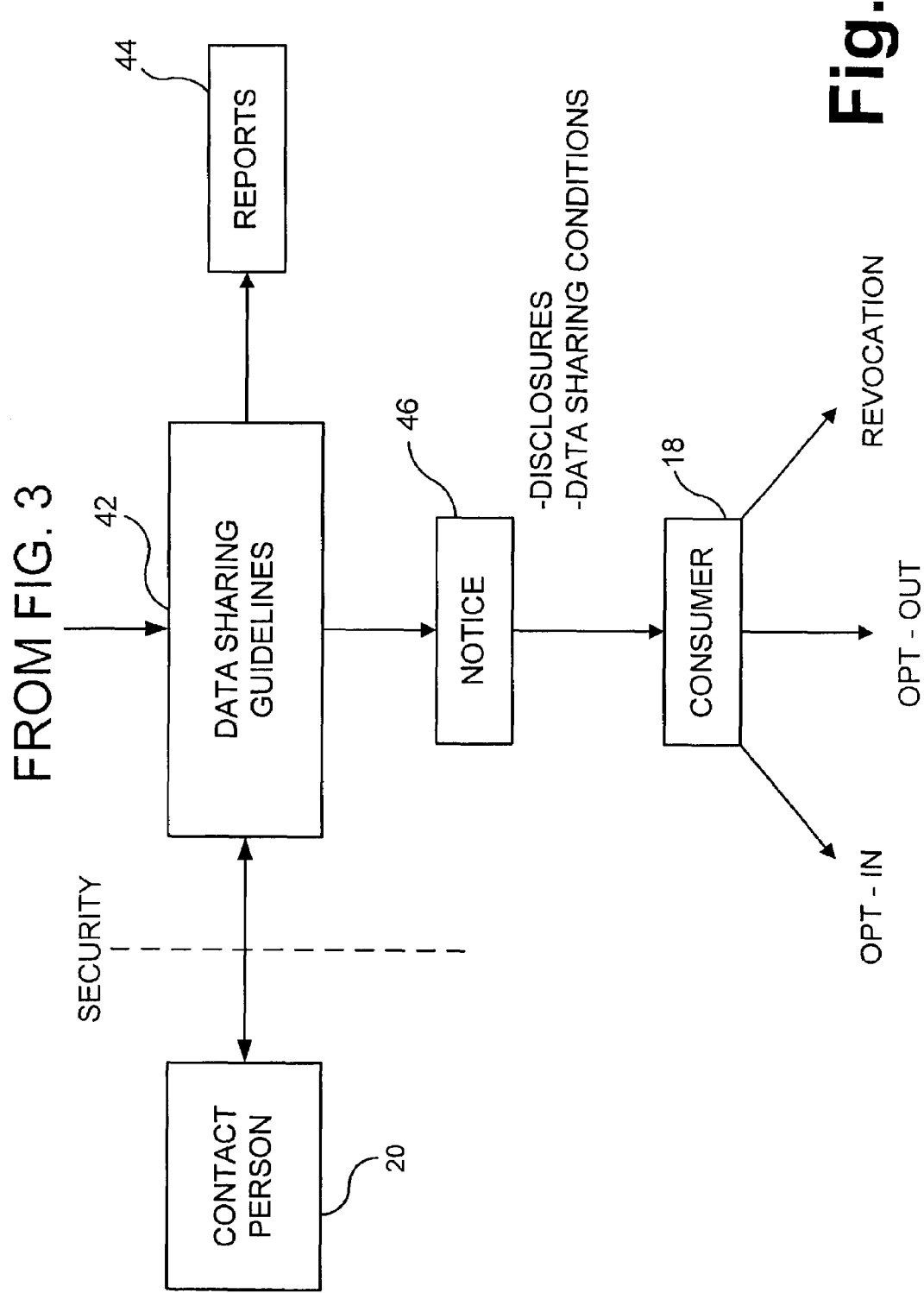
FIG. 4 is a process flow diagram illustrating the notice and reply processes of one embodiment of the present invention.

Referring to FIG. 4, once the system has received and/or determined 1) the sharing relationship (34) between the parties and 2) the type of data (38) to be shared, a data sharing arrangement (40) may be formulated. For example, non-public personally identifiable health information for sharing with a non-affiliated third party may be categorized as data sharing arrangement "A" and cross-referenced to one or more applicable data sharing guidelines (42) held upon the storage device (14). This process may be repeated to create a database of cross-referenced information for later use.

In one embodiment, the data sharing guidelines (42) are stored according to their applicability to sharing relationship/data type combinations (34 and 38, respectively). This feature of the present invention allows quick and efficient retrieval of applicable data sharing guidelines. In one embodiment, data sharing guidelines are composed of paraphrased State and/or Federal regulations applicable to one or more data sharing arrangements (40) such that each data sharing guideline may be readily understood by the user.

In one embodiment, the present invention provides excerpts and/or cites to the applicable statute or regulation upon which the data sharing guidelines (40) are based. For example, in response to a proposed data sharing arrangement, the system informs the user that annual notice to the consumer is required (i.e., the data sharing guideline) and provides references to the privacy statute (i.e., GLB, Fair Credit Reporting Act (FCRA), etc.) at issue. This feature of the present invention allows the user to conveniently review the relevant statute or rule if a question arises.

In one embodiment, the purpose of the proposed information sharing activity is also utilized to formulate the applicable data sharing arrangement (34). For example, the law may impose less stringent requirements upon an insurance company sharing non-public information, if the company has a legitimate insurance reason for doing so. On the other hand, a company that shares such information merely for marketing purposes may be subjected to more stringent requirements.

The characteristics of the proposed information sharing activity are utilized to develop a business rule or requirement (i.e., a data sharing guideline) that informs the user how to comply with applicable privacy regulations. Once a data sharing arrangement has been associated with one or more applicable requirements, the present invention allows the user to view and/or print comprehensive reports (44) illustrating same.

For many information sharing activities, privacy regulations require that the consumer (18) be provided with some form of notice (46). In one embodiment, each data sharing guideline includes a description of one or more notice disclosures that must be provided to the consumer to constitute sufficient notice under the applicable regulation. In another embodiment, the computer system (10) of the present invention may be preprogrammed with a plurality of notice clauses, each of which may be automatically incorporated into one or more consumer notices. In any event, the notice must provide the user with a description of the information sharing arrangement and any data sharing conditions impacting the arrangement.

Referring back to FIG. 1, notice to the consumer may be provided via hard copy as illustrated by printer/fax machine (26), via telephone (not shown), or via electronic transmission. In one embodiment, notice is provided to the consumer through a website interface and/or via electronic mail transmitted over a computer network (16). In turn, the consumer (18) may respond utilizing the above transmission alternatives or simply drop by in person. Depending on the applicable data sharing guideline, the consumer's reply, if any, to the notice may contain an express consent provision (i.e., an "opt in" to the proposed data sharing arrangement), consent refusal (i.e., an opt out to the proposed data sharing arrangement) or revocation of a previous consent.

Consumer feedback and/or replies to notice provisions may be imported through a computer network or manually entered via an input device (24) into the system (10) for storage and later use. This feature of the present invention allows the storage device to be continually updated with customer preference information to ensure that information sharing regulations and customer preferences are complied with. In one embodiment, consumer preference information may be imported or manually entered into each record relating to the particular consumer. In another embodiment, the graphic user interface of the present invention provides a comment field (62) for each data sharing arrangement into which such information may be entered, as discussed further below.

In one embodiment, the system maintains security information relating to each data sharing arrangement held upon the system. For many data sharing arrangements, some measure of security has already been provided to protect shared data notwithstanding Governmental requirements. For example, most companies insist upon a non-disclosure or confidentiality provision within the body of a contract dealing with an exchange of information. Further, data encryption may be required under contractual obligation for the exchange of electronic information by some companies.

The present invention accounts for the pre-existing security measures by storing such information upon the storage device (14). In one embodiment, the graphic user interface of the present invention provides a security measures display and edit field (56 and 56D, respectively), as discussed further below. This allows the user to view any security measure in place for any number of data sharing arrangements held upon the system.

In some instances, an applicable information sharing regulation may be rendered inapplicable due to the existence of an exemption. For example, the Graham-Leach-Bliley Act allows a financial institution to release information for the purpose of complying with a law or rule, to report to a consumer reporting agency, or as necessary to effect a transaction requested or authorized by the consumer.

The present invention accounts for possible exemptions by retrieving and storing such information upon the storage device (14). In one embodiment, the graphic user interface of the present invention provides a view/add exemptions tab (60) as well as a separate exemptions screen (not shown) for entry and display of exemption information. As described above, exemption information may also be electronically imported into the system from an external storage device or repository.

Figure 7:
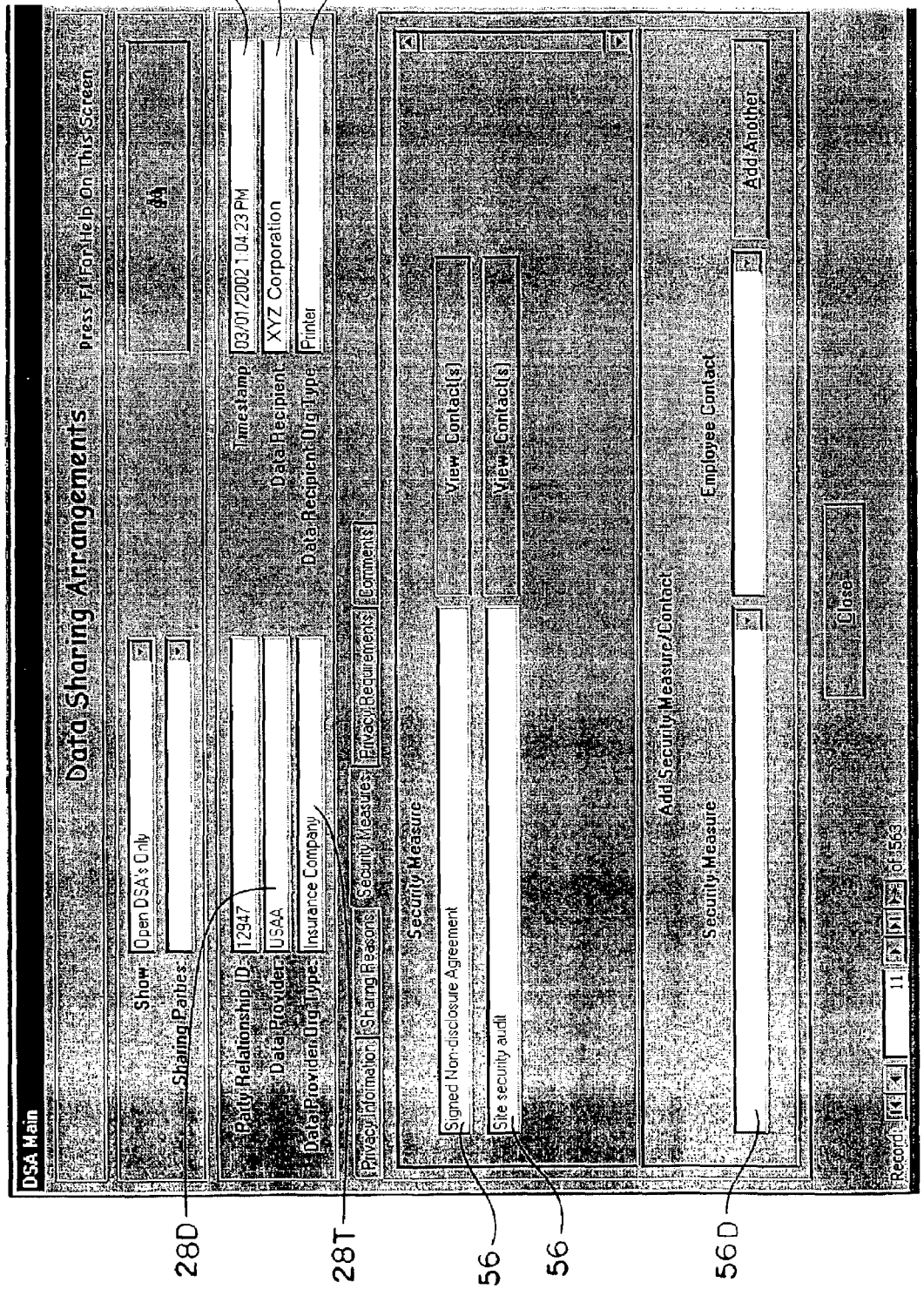
FIG. 7 is a screen shot of the graphic user interface of one embodiment of the present invention illustrating the "security measures" tab.
Figure 8:
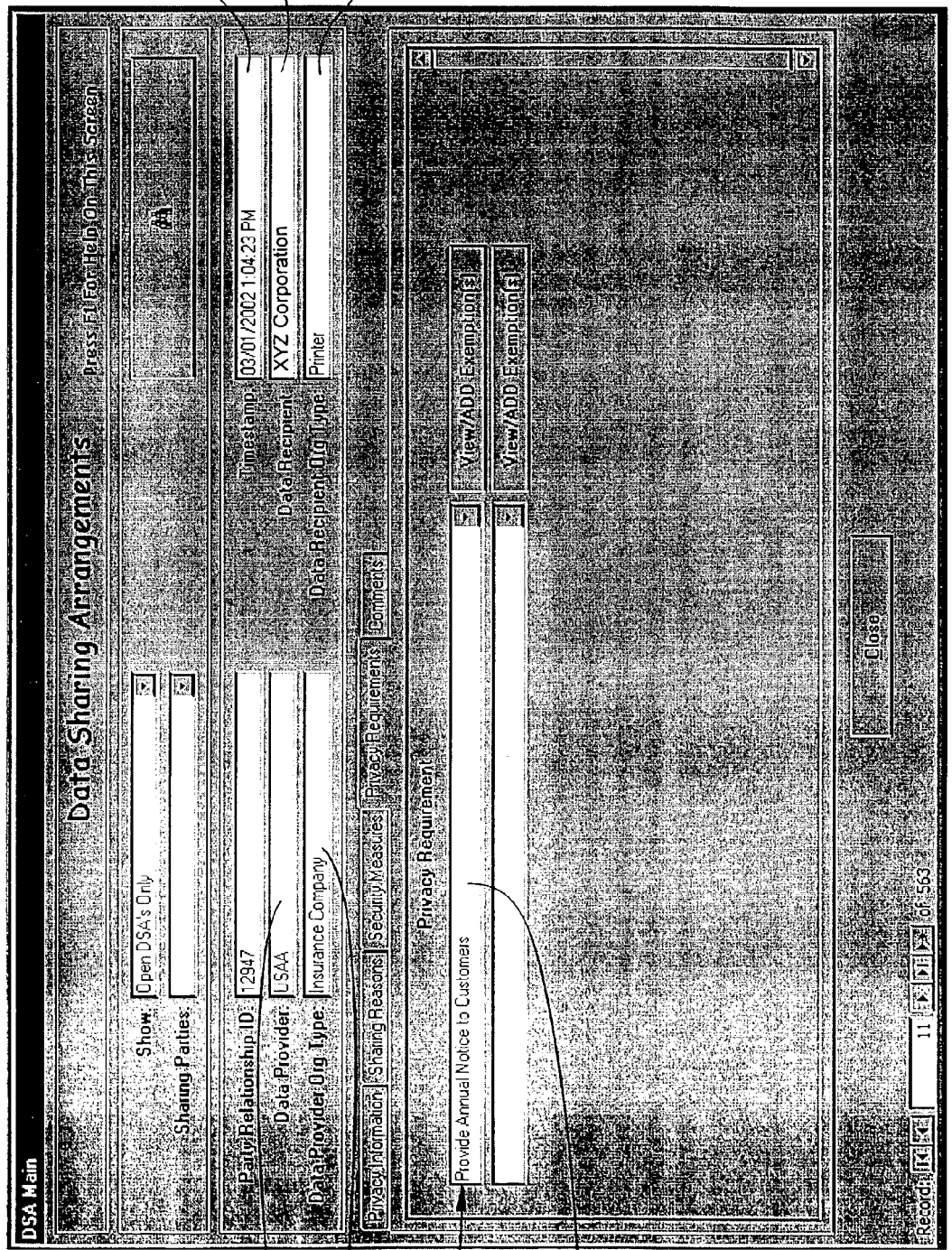
FIG. 8 is a screen shot of the graphic user interface of one embodiment of the present invention illustrating the "privacy requirements" tab.
Figure 9:
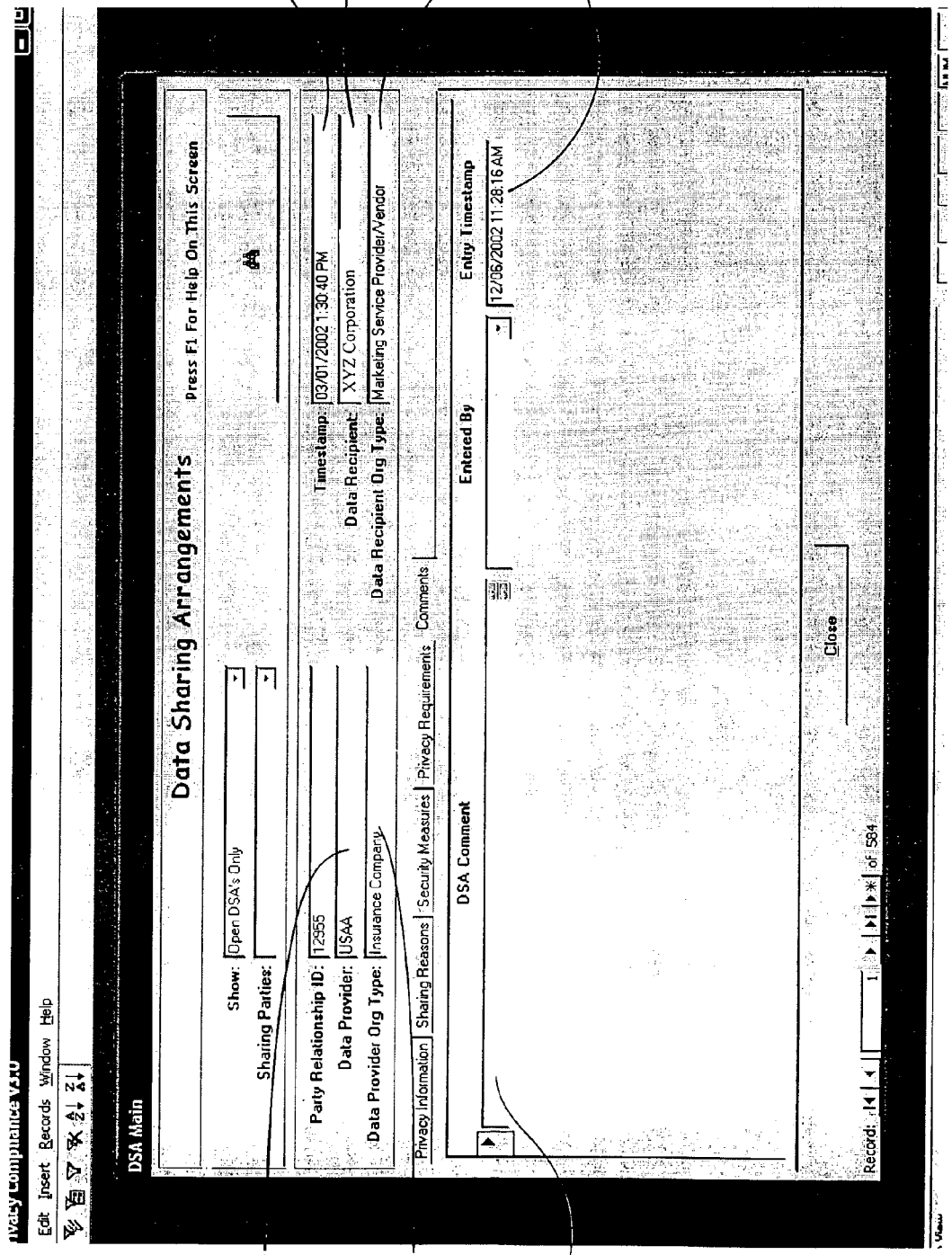
FIG. 9 is a screen shot of the graphic user interface of one embodiment of the present invention illustrating the "comments" tab.

In one embodiment, the present invention maintains timestamp data (48) relating to each data sharing arrangement entered into the system, as illustrated in FIGS. 5-9. Further, the present invention maintains entry timestamp data (50) relating to the receipt of consumer feedback, as illustrated in FIG. 9. In another embodiment, the present invention maintains log records indicating all system activity, including the time and date that notices or other compliance material is provided to the consumer.

The graphic user interface provided by the present invention allows the user to conveniently view and edit data sharing arrangements. Each data sharing arrangement may be displayed according to a plurality of criteria. For example, each of FIGS. 5-9 provide general information such as sharing and receiving party identification information (28D and 30D, respectively), sharing and receiving party type information (28T and 30T, respectively), and timestamp information (48), as described above.

Figure 5:
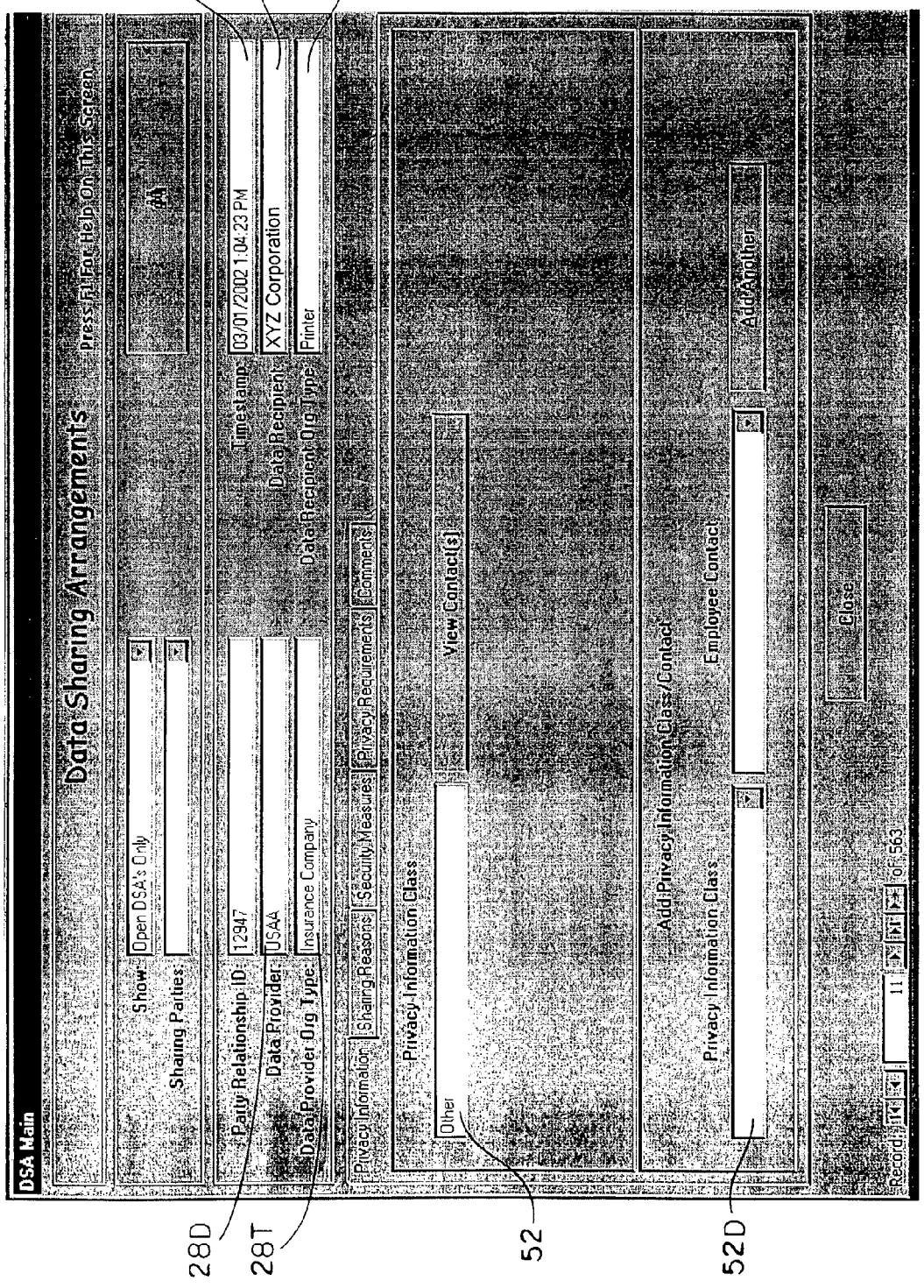
FIG. 5 is a screen shot of the graphic user interface of one embodiment of the present invention illustrating the "privacy information" tab.

Additionally, the graphic user interface of the present invention provides a number of tabs capable of efficiently leading the user to more specific data sharing arrangement information. For example, FIG. 5 illustrates the privacy information tab which provides for the display (52) and/or edit (52D) of the data type (38), as described above.

Figure 6:
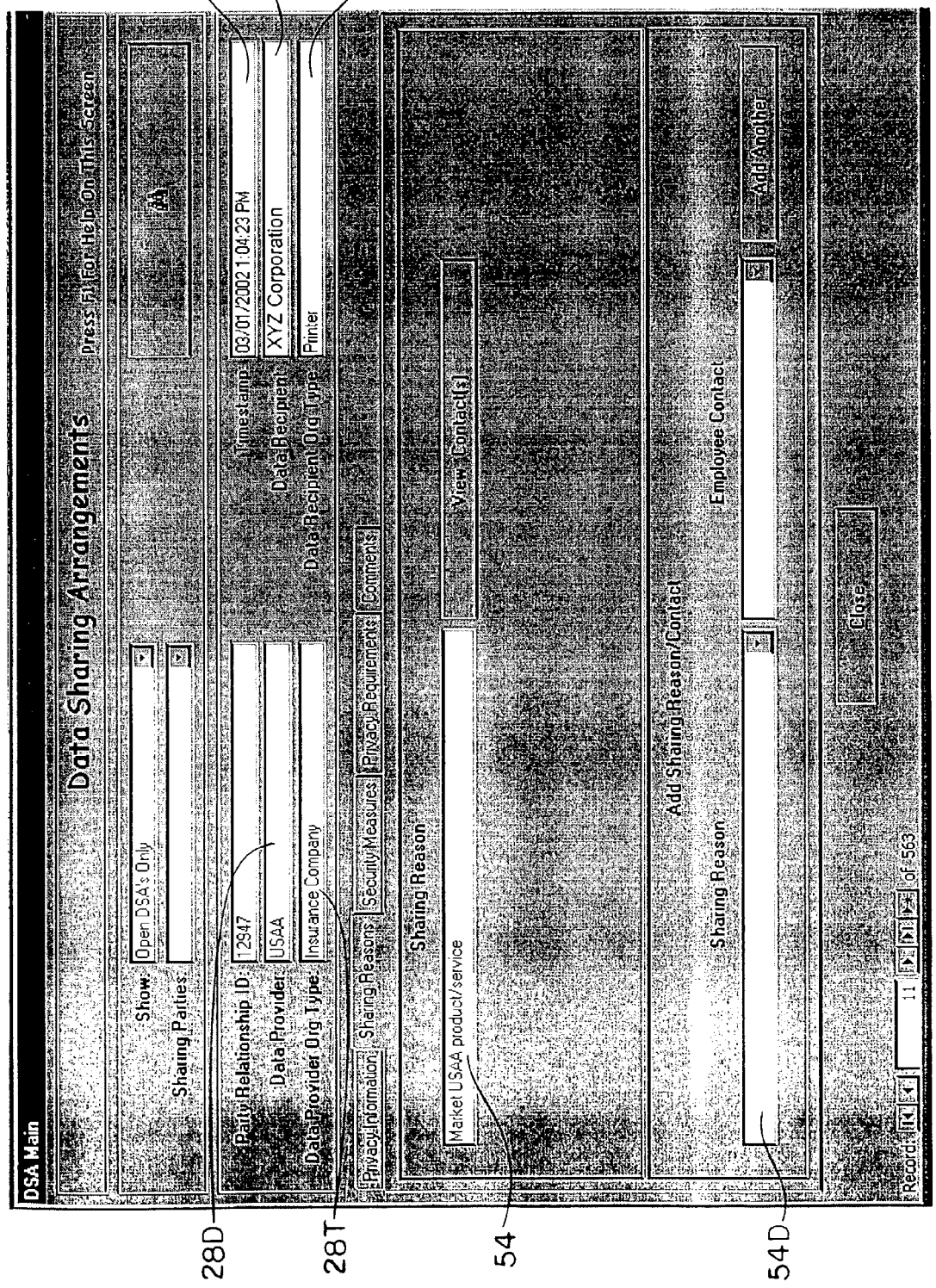
FIG. 6 is a screen shot of the graphic user interface of one embodiment of the present invention illustrating the "sharing reasons" tab.

In turn, FIG. 6 illustrates the sharing reasons tab which provides for the display (54) and/or edit (54D) of the sharing reasons applicable to the sharing arrangement, as described above. FIG. 7 illustrates the security measures tab which provides for the display (56) and/or edit (56D) of security measures utilized for any given data sharing arrangement.

FIG. 8 illustrates the privacy requirements tab which provides for the display (58) of data sharing guidelines (42). Finally, FIG. 9 illustrates the comments tab which provides for the display (62), edit and entry timestamping (50) utilized for consumer preference information.

This feature of the present invention allows the user to stay informed regarding security of the data as well as conveniently assess security risks associated with the sharing arrangement. If necessary, the user may add additional security measures through entry field (56D).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method of facilitating compliance with one or more information sharing regulations, comprising the steps of:

storing, in a storage medium, data sharing guidelines according to their applicability to predetermined sharing relationship/data type combinations, thereby allowing for efficient retrieval of applicable data sharing guidelines, wherein said data sharing guidelines stored in said storage medium include paraphrased State and/or Federal information sharing regulations applicable to one or more data sharing arrangements;

identifying at least one primary party for sharing data and at least one secondary party for receiving shared data;

classifying said primary party as belonging to a first party type, wherein said first party type is selected from a plurality of predetermined party types;

classifying said secondary party as belonging to a second party type, wherein said second party type is selected from said plurality of predetermined party types;

utilizing said first party type and said second party type, defining a sharing relationship between said primary party and said secondary party, wherein the act of defining a sharing relationship includes identifying the first and second parties as being one of affiliated and non-affiliated;

defining said data as belonging to a data type, wherein said data type is selected from a plurality of predetermined data types including a public data type, a non-public data type, and a non-public personally identifiable data type, and wherein said non-public personally identifiable data type is divided into subcategories including at least health related data and credit related data;

utilizing said relationship and said data type, as well as information concerning a purpose of a proposed information sharing activity, defining a data sharing arrangement between said primary party and said secondary party; and retrieving from said storage medium data sharing guidelines relating to said sharing arrangement, said guidelines providing guidance to facilitate compliance with said information sharing regulations applicable to said data sharing arrangement.

2. The method of claim 1, further comprising the additional step of providing one or more contact persons associated with said data sharing arrangement.

3. The method of claim 1, wherein said data sharing guidelines further comprise one or more exemptions.

4. The method of claim 1, wherein said data sharing arrangement further comprises one or more reasons for sharing said data between said parties.

5. The method of claim 1 or 4, further comprising the additional step of compiling one or more reports illustrating said data sharing guidelines and said related data sharing arrangements in combination.

6. The method of claim 1, further comprising the additional step of assessing one or more security risks associated with said data sharing arrangement.

7. The method of claim 6, further comprising the additional step of determining whether one or more security measures are in place to protect said data from unauthorized access.

8. The method of claim 7, further comprising the additional step of instituting supplementary security measures to protect said data from unauthorized access.

9. The method of claim 1, further comprising the additional steps of:
determining a consumer associated with said shared data;
preparing a notice according to said data sharing guidelines; and
transmitting said notice to said consumer.

10. The method of claim 9, wherein said notice further comprises an opt-out provision for providing said consumer with an opportunity to decline said data sharing arrangement.

11. The method of claim 9, wherein said notice further comprises an opt-in provision for providing said consumer with an opportunity to provide express written consent to said data sharing arrangement.

12. The method of claim 9, wherein said notice further comprises a revocation provision for providing said consumer with an opportunity to revoke consent to said data sharing arrangement.

13. The method of claim 9, wherein said notice further comprises one or more data sharing conditions.

14. A computer system for facilitating compliance with one or more information sharing regulations comprising:
an input device; and
a processing unit coupled to said input device and configured for:
storing, in a storage medium, data sharing guidelines according to their applicability to predetermined sharing relationship/data type combinations, thereby allowing for efficient retrieval of applicable data sharing guidelines, wherein said data sharing guidelines stored in said storage medium include paraphrased State and/or Federal information sharing regulations applicable to one or more data sharing arrangements;
receiving identifying information relating to at least one primary data sharing party and at least one secondary data receiving party;
classifying said primary party as belonging to a first party type, wherein said first party type is selected from a plurality of predetermined party types;
classifying said secondary party as belonging to a second party type, wherein said second party type is selected from said plurality of predetermined party types;
utilizing said first party type and said second party type, defining a sharing relationship between said primary party and said secondary party, wherein the act of defining a sharing relationship includes identifying the first and second parties as being one of affiliated and non-affiliated
defining said data as belonging to a data type, wherein said data type is selected from a plurality of predetermined data types including a public data type, a non-public data type, and a non-public personally identifiable data type, and wherein said non-public personally identifiable data type is divided into subcategories including at least health related data and credit related data;
utilizing said relationship and said data type, as well as information concerning a purpose of a proposed information sharing activity, defining a data sharing arrangement between said primary party and said secondary party; and,
retrieving from said storage medium data sharing guidelines relating to said sharing arrangement, said guidelines providing guidance to facilitate compliance with said information sharing regulations applicable to said data sharing arrangement.

15. The computer system of claim 14, further comprising a storage device capable of storing electronic data, said storage device being coupled to said processing unit such that electronic data may pass therebetween.

16. The computer system of claim 14, wherein said processing unit is further configured for:
determining a consumer associated with said shared data;
preparing a notice according to said data sharing guidelines; and,
transmitting said notice to said consumer.

17. The computer system of claim 16, wherein said notice is transmitted to said consumer via a computer network.

18. The computer system of claim 16, wherein said notice further comprises an opt-out provision for providing said consumer with an opportunity to decline said data sharing arrangement.

19. The computer system of claim 16, wherein said notice further comprises an opt-in provision for providing said consumer with an opportunity to provide express written consent to said data sharing arrangement.

20. The computer system of claim 16, wherein said notice further comprises a revocation provision for providing said consumer with an opportunity to revoke consent to said data sharing arrangement.

* * * * *